United States Patent
Hageman et al.

(10) Patent No.: US 11,386,764 B2
(45) Date of Patent: Jul. 12, 2022

(54) DETECTING OBJECTS IN A RESTRICTED ZONE

(71) Applicants: Deere & Company, Moline, IL (US); Carnegie Mellon University, Pittsburgh, PA (US)

(72) Inventors: John M. Hageman, Dubuque, IA (US); Herman Herman, Gibsonia, PA (US); Tarik Loukili, Johnston, IA (US)

(73) Assignees: Deere & Company, Moline, IL (US); Carnegie Mellon University, Pittsburgh, PA (US)

( * ) Notice: Subject to any disclaimer, the term of this patent is extended or adjusted under 35 U.S.C. 154(b) by 102 days.

(21) Appl. No.: 16/589,887

(22) Filed: Oct. 1, 2019

(65) Prior Publication Data
US 2021/0097839 A1 Apr. 1, 2021

(51) Int. Cl.
*G08B 21/02* (2006.01)
*H04W 4/90* (2018.01)
*H04W 88/04* (2009.01)
*G06V 20/52* (2022.01)
*G06V 40/10* (2022.01)

(52) U.S. Cl.
CPC ............. *G08B 21/02* (2013.01); *G06V 20/52* (2022.01); *G06V 40/10* (2022.01); *H04W 4/90* (2018.02); *H04W 88/04* (2013.01)

(58) Field of Classification Search
CPC ............... G08B 21/02; G06K 9/00362; G06K 9/00771; H04W 88/04; H04W 4/90
See application file for complete search history.

(56) References Cited

U.S. PATENT DOCUMENTS

| 8,031,068 B1 | 10/2011 | Steadman et al. |
| 8,653,956 B2 | 2/2014 | Berkobin et al. |
| 9,222,771 B2 | 12/2015 | Rosengaus et al. |

(Continued)

FOREIGN PATENT DOCUMENTS

JP 2014172754 9/2014

OTHER PUBLICATIONS

European Search Report issued in counterpart application No. 20191224.3 dated Oct. 19, 2020 (09 pages).
Park , "Automated 3D Vision-Based Tracking of Construction Entities", A Dissertation Presented to the Academic Family, Georgia Institute of Technology, Dec. 2012, 175 pages.

(Continued)

*Primary Examiner* — Joseph H Feild
*Assistant Examiner* — Sharmin Akhter
(74) *Attorney, Agent, or Firm* — Kilpatrick Townsend & Stockton LLP

(57) ABSTRACT

One or more undesired objects can be detected in a restricted zone at worksite. In one example, a base station is configured to be placed in or around the restricted zone. The base station includes a housing, a sensor suite, and a base station controller. The sensor suite is configured to detect one or more undesired object in a subzone at least partially overlapping with the restricted zone and generate an output signal based on the undesired object. The subzone is limited by a range of detection from the sensor suite. The base station controller can receive the output signal from the sensor suite and transmit an alert signal. A warning indicator can receive the alert signal and activate in response to receiving the alert signal. The warning indicator can be positioned on the base station or on a mobile device located remote from the base station.

19 Claims, 8 Drawing Sheets

(56) References Cited

U.S. PATENT DOCUMENTS

| | | | |
|---|---|---|---|
| 9,269,255 B2 | 2/2016 | Beaulieu et al. | |
| 9,301,094 B2 | 3/2016 | Jajoo et al. | |
| 9,535,586 B2 | 1/2017 | Johnson et al. | |
| 9,741,225 B1 | 8/2017 | Kanan | |
| 9,987,981 B1 | 6/2018 | Deyaf et al. | |
| 10,046,699 B2 | 8/2018 | Hathaway et al. | |
| 2009/0043462 A1 | 2/2009 | Stratton et al. | |
| 2012/0046859 A1* | 2/2012 | Imes | H02J 13/00034 |
| | | | 701/409 |
| 2015/0161872 A1 | 6/2015 | Beaulieu et al. | |
| 2015/0346968 A1* | 12/2015 | Johnson | G06F 3/04842 |
| | | | 715/771 |
| 2017/0200306 A1* | 7/2017 | Marsolek | G06T 17/05 |
| 2017/0236096 A1* | 8/2017 | Tvaroh | G06F 3/0484 |
| | | | 705/32 |
| 2018/0091741 A1* | 3/2018 | Ida | H04N 5/23293 |
| 2018/0174426 A1* | 6/2018 | Jones | E04H 17/003 |
| 2018/0347752 A1* | 12/2018 | Costello | G01S 17/89 |

OTHER PUBLICATIONS

Shrestha et al., "Hard-Hat Detection for Construction Safety Visualization", Journal of Construction Engineering, Hindawi Publishing Company, vol. 2015, Article ID 721380, Copyright 2015, 8 pages.

European Examination Report and Written Opinion issued in European Patent Application No. 20191224.3, dated Mar. 3, 2022, in 14 pages.

* cited by examiner

DETECTING OBJECTS IN A RESTRICTED ZONE

CROSS-REFERENCE TO RELATED APPLICATIONS

N/A

FIELD OF THE DISCLOSURE

The present disclosure relates to detecting one or more objects (e.g., undesired objects) in a restricted zone.

BACKGROUND

The use of work machines may place members of the public, operators, and surrounding traffic at risk if undesired objects or persons enter a restricted area. This may occur in either rural or urban areas. Restricted areas in rural areas may be difficult to secure because of its large perimeter, and relative infrequence of undesirable objects or persons. Restricted areas in urban areas may be difficult to secure because of high traffic, and the restricted area acquiring a crowded space. Common methods of addressing this issue include warning signs, static warning lights, and physical barriers (e.g. fencing) and other methods of alerting objects where safety is dependent on the object's awareness and compliance when entering a restricted zone. Other known attempts at improving safety in a restricted site includes having operators wear tracking devices, such as safety vests outfitted with transmitters wirelessly coupled with beacons placed throughout the restricted area. The tracking devices worn by the operator would alert the operator wearing the device when they've entered a restricted zone. However, this approach is expensive and cumbersome because it requires that each individual comply with a tracking device. Furthermore, it fails to identify those objects not wearing a transmitter. Therein lies a need to improve the warning methods and process to objects and surrounding personnel when undesired objects enter a restricted area.

SUMMARY

This summary is provided to introduce a selection of concepts that are further described below in the detailed description and accompanying drawings. This summary is not intended to identify key or essential features of the appended claims, nor is it intended to be used as an aid in determining the scope of the appended claims.

The present disclosure relates to detecting one or more undesired objects in a restricted zone at a worksite. In one example, a base station is configured to be placed proximate to (e.g., in or around) the restricted zone. The base station includes a housing, a sensor suite, and a base station controller. The sensor suite is configured to detect one or more undesired object in a subzone at least partially overlapping with the restricted zone and generate an output signal based on the undesired objects. The subzone is limited by a range of detection from the sensor suite. The base station controller receives the output signal from the sensor suite and generates an alert signal. The alert signal can be configured to activate a warning indicator on the base station or on a mobile device located remote from the base station.

The base station may further comprise a location module configured to detect a geographical location of the base station.

The mobile device may comprise a user input interface with a touch screen display, an interface module, and a geofence module. The interface module may be configured to display an aerial map of the worksite on the touch screen display, and receive operator input from the touch screen display. The operator input may result from an operator touching the touch screen display. The geofence module may be configured to derive a geofence subzone further defined by the operator input. In order to derive the geofence subzone, the geofence module is configured to determine a location of the operator input on the aerial map, identify a location of at least one base station on the aerial map, and identify an overlap between the subzone and the geofence subzone where detection of the one or more undesired objects is enforced. The geofence module may be further configured to identify at least one geographical structure proximate to the location of the operator input; and construct a polygonal representation of the operator input to define the geofence relative to the geographical structure on the aerial map.

The system may further comprise a second base station configured to detect one or more undesired objects in a second subzone, wherein the second base station is communicatively coupled with the first base station.

The sensor suite on the base station may comprise any combination of radar sensors, ultrasonic sensors, capacitive sensors, photoelectric sensors, inductive sensors, laser sensors, thermal sensors, infrared sensors, image sensors, and/or motion detectors.

The base station may further comprise a sending module emitting a steady signal configured toward a surface; and a receiving module configured to receive a reflection of the steady signal after it has bounced off the surface.

The system may further comprise a work machine communicatively coupled to the base station controller. The work machine may include a second warning indicator configured to alert an operator in a cab of the work machine in response to receiving the alert signal. The work machine may further derate operation or halt operation of the work machine in response to receiving the alert signal.

Another example may involve a method for restricted zone enforcement. The method may include detecting, by a base station placed in or around a restricted zone at a worksite, one or more undesired objects in a subzone at least partially overlapping with the restricted zone. The subzone can be limited by a range of detection from a sensor suite of the base station. The method may also include transmitting, by the base station, an alert signal in response to detecting the one or more undesired objects in the subzone. The alert signal can be configured to activate a warning indicator located on the base station or a mobile device (e.g., that is remote from the base station). Yet another example may involve a non-transitory computer-readable medium comprising program code that is executable by a processor for causing the processor to implement the above method.

These and other features will become apparent from the following detailed description and accompanying drawings, wherein various features are shown and described by way of illustration. The present disclosure is capable of other and different configurations and its several details are capable of modification in various other respects, all without departing from the scope of the present disclosure. Accordingly, the detailed description and accompanying drawings are to be regarded as illustrative in nature and not as restrictive or limiting.

BRIEF DESCRIPTION OF THE DRAWINGS

The detailed description of the drawings refers to the accompanying figures in which:

FIG. 2 is a view of a base station in a collapsed form according to the embodiment in

FIG. 1.

DETAILED DESCRIPTION

The embodiments disclosed in the above drawings and the following detailed description are not intended to be exhaustive or to limit the disclosure to these embodiments. Rather, there are several variations and modifications which may be made without departing from the scope of the present disclosure.

As used herein, the term "controller" is a computing device including a processor and a memory (e.g., a non-transitory computer readable medium). The "controller" may be a single device or alternatively multiple devices.

As used herein, the term "module" refers to any hardware, software, firmware, electronic control component, processing logic, processing device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

As used herein, unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

Figure 1:
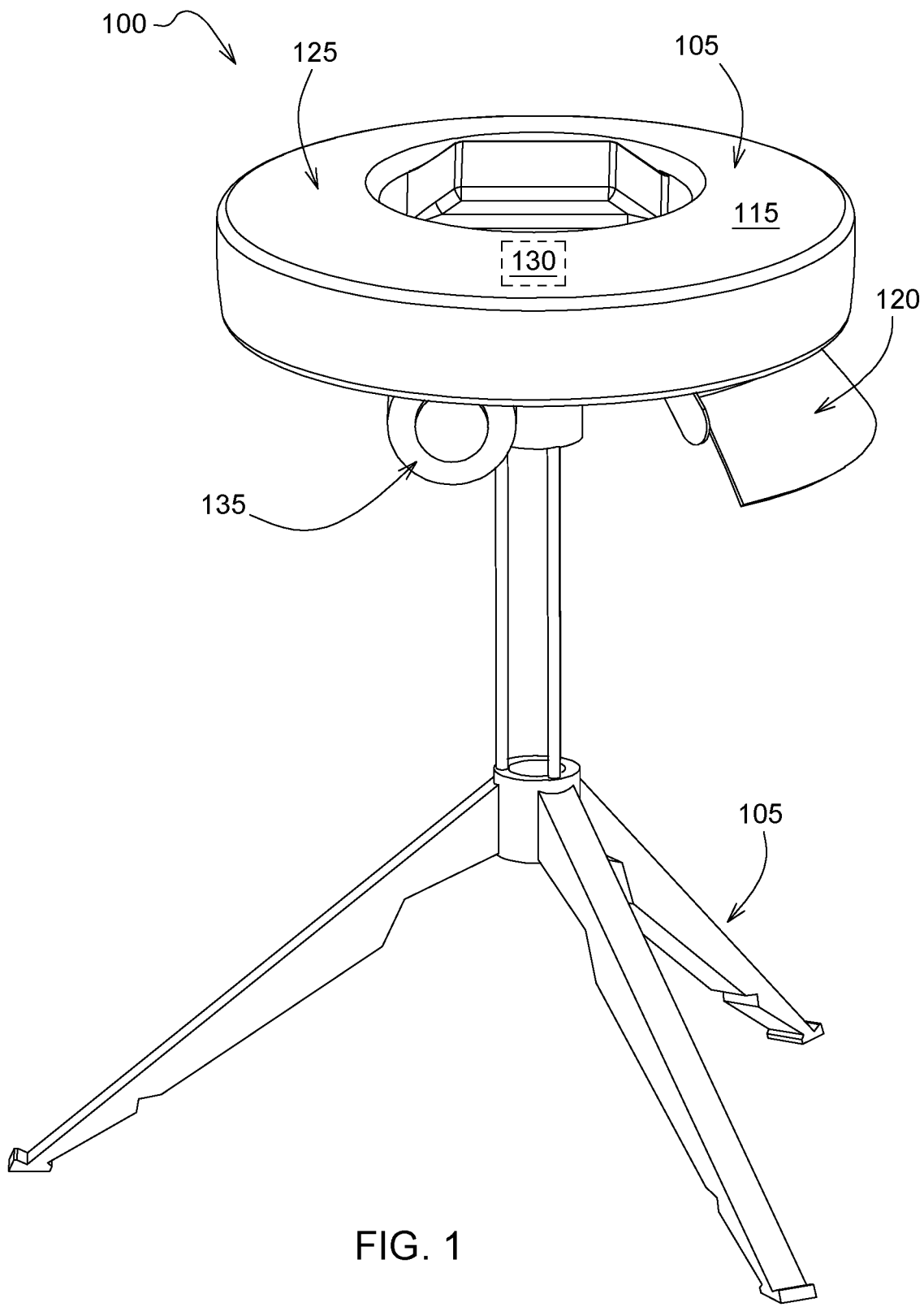
FIG. 1 is a perspective view of a base station according to a first embodiment.
Figure 3:
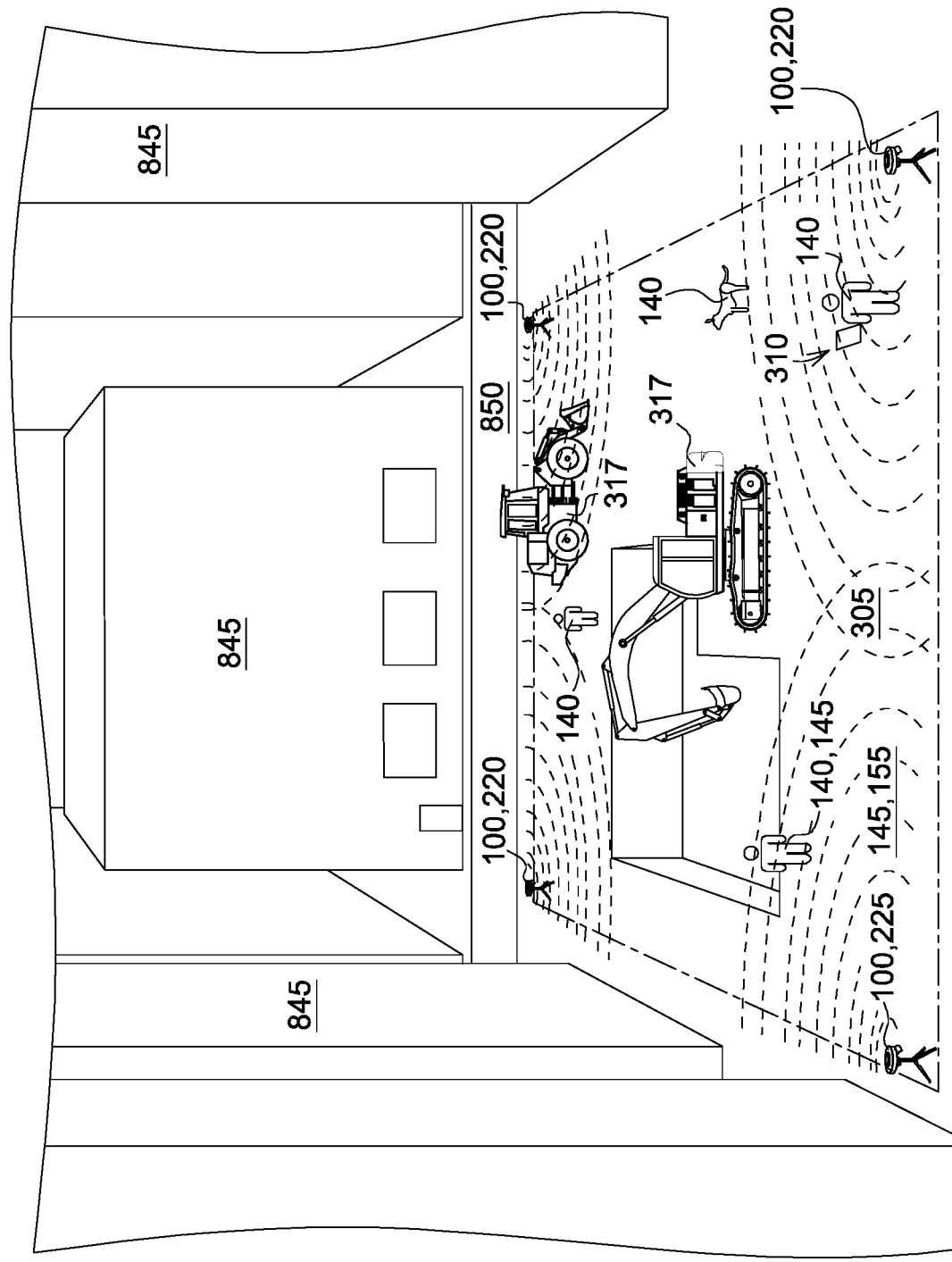
FIG. 3 is a schematic diagram of a restricted zone enforcement system.
Figure 4:
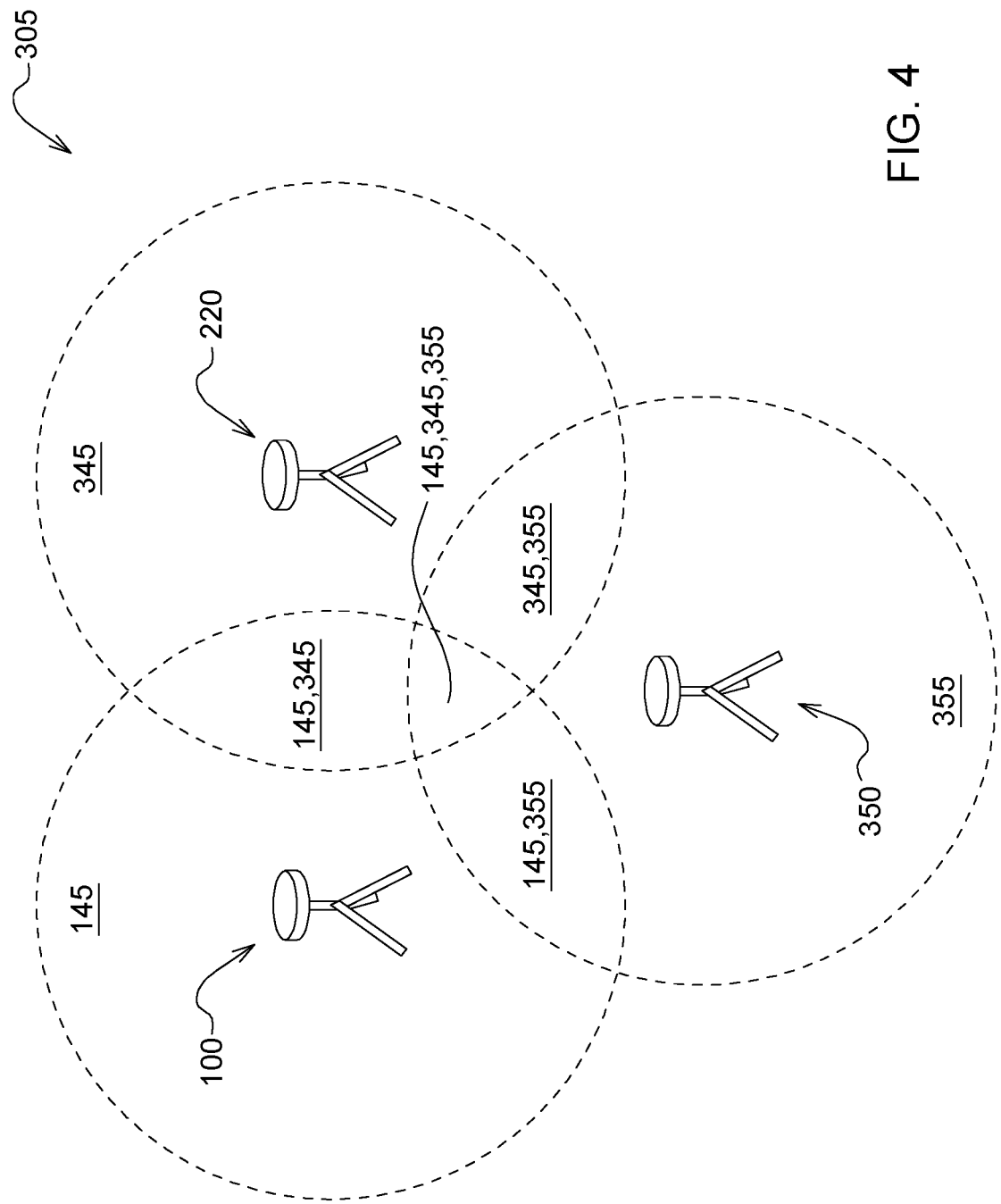
FIG. 4 is an aerial view of a restricted zone enforcement system according to a first embodiment.

FIG. 1 illustrates a perspective view of a base station 100 for restricted zone enforcement according to a first embodiment, wherein the base station 100 enables detection of one or more undesired objects in a restricted zone 305 (shown in FIG. 3 by the dotted line).

The base station 100 is configured to be placed in or around the restricted zone. The base station 100 may be used as a stand-alone apparatus, or in conjunction with one or more additional base stations, depending on the area needing coverage, and the method used to communicatively couple one base station 100 to another. When using more than one base station 100, the network or system of base stations creates a scalable "fabric" of restrictive zone enforcement.

Figure 2:
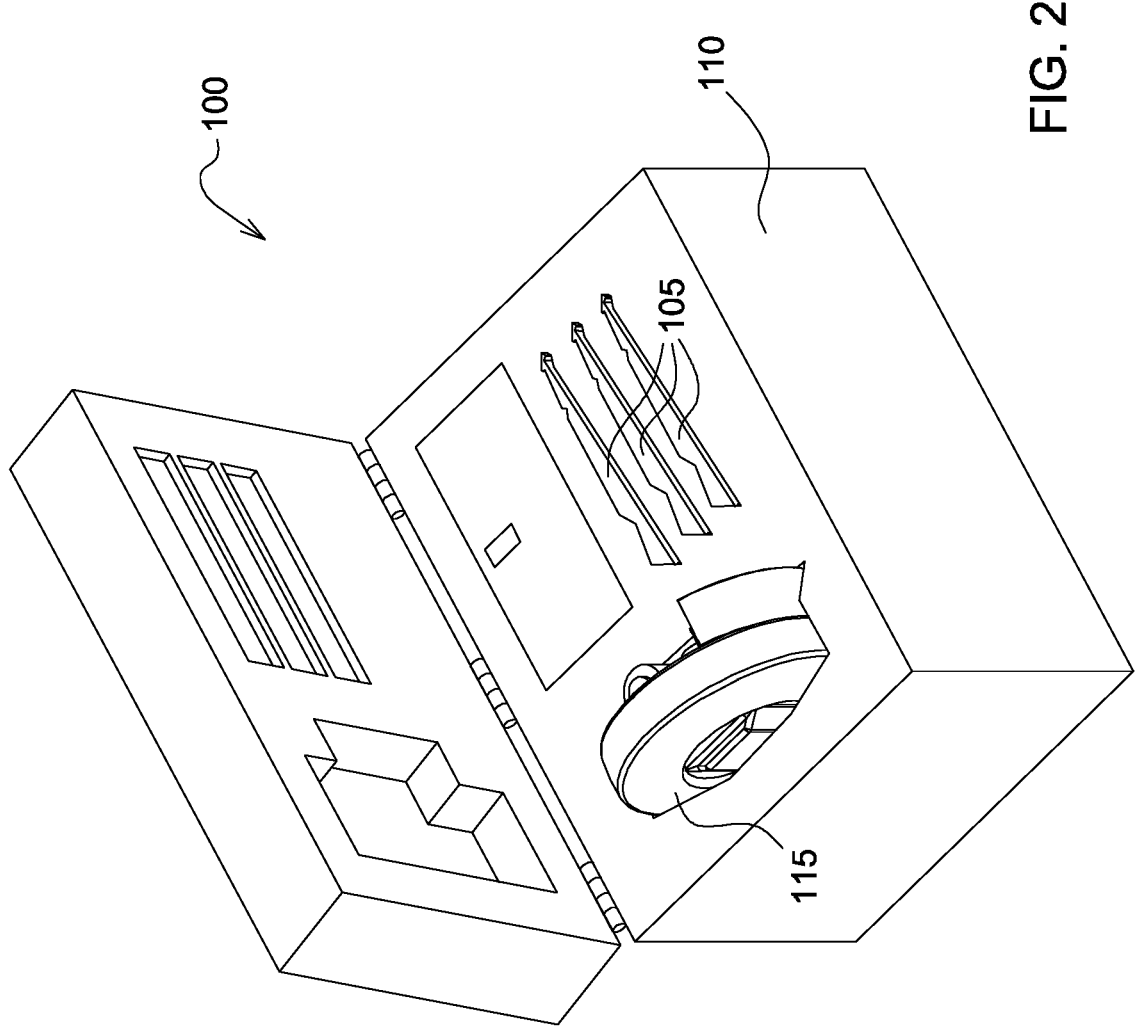

In a first embodiment, the base station 100 may be portable. That is, the base station 100 may include collapsible legs 105, and an isolated power source (not shown) such as a battery or solar panel. The collapsible legs 105 may comprise one or more of a configuration wherein the collapsible legs 105 fold outwards in a tripod configuration, telescopically extend, and detachable couple to the head 115 comprising a sensor suite 120. The base station 100 may be sufficiently lightweight and collapsible in size to hand carry for placement in or around a restrictive zone 305. FIG. 2 schematically demonstrates a portable version of base station 100 small enough to hand carry and packable in a case 110. In an alternative embodiment, the base station 100 may be sufficiently large with a weighted bottom portion to ensure stability in severe weather conditions such as high winds or torrential rains and may absorb vibrations in high traffic areas. However, the base station 100 can be small enough to transport on industry standard roads and pavements. In yet another embodiment, the base station 100 may be electronically coupled to a vehicle or a trailer or solar panel, wherein the vehicle or trailer or solar panel comprises the power source for operating the base station 100 in or around a restrictive zone 100. Functionally similar to the afore-mentioned embodiments, the third embodiment may be smaller in size because the power is sourced external to the base station 100 rather than internal.

The base station 100 may comprise of a housing 125, a sensor suite 120, a base station controller 130, and one or more warning indicators 135 located on the base station 100. The housing 125 shields the internal components of the base station 100 from environmental conditions such as dust, heat, water, and debris from a worksite to name a few. The housing 125 may comprise of an external tough material such metal, and an internal material for heat or vibration insulation. Alternatively, the housing 125 may comprise of a plastic, or another relatively lightweight material to enable ease of carrying and transportation.

Figure 8:
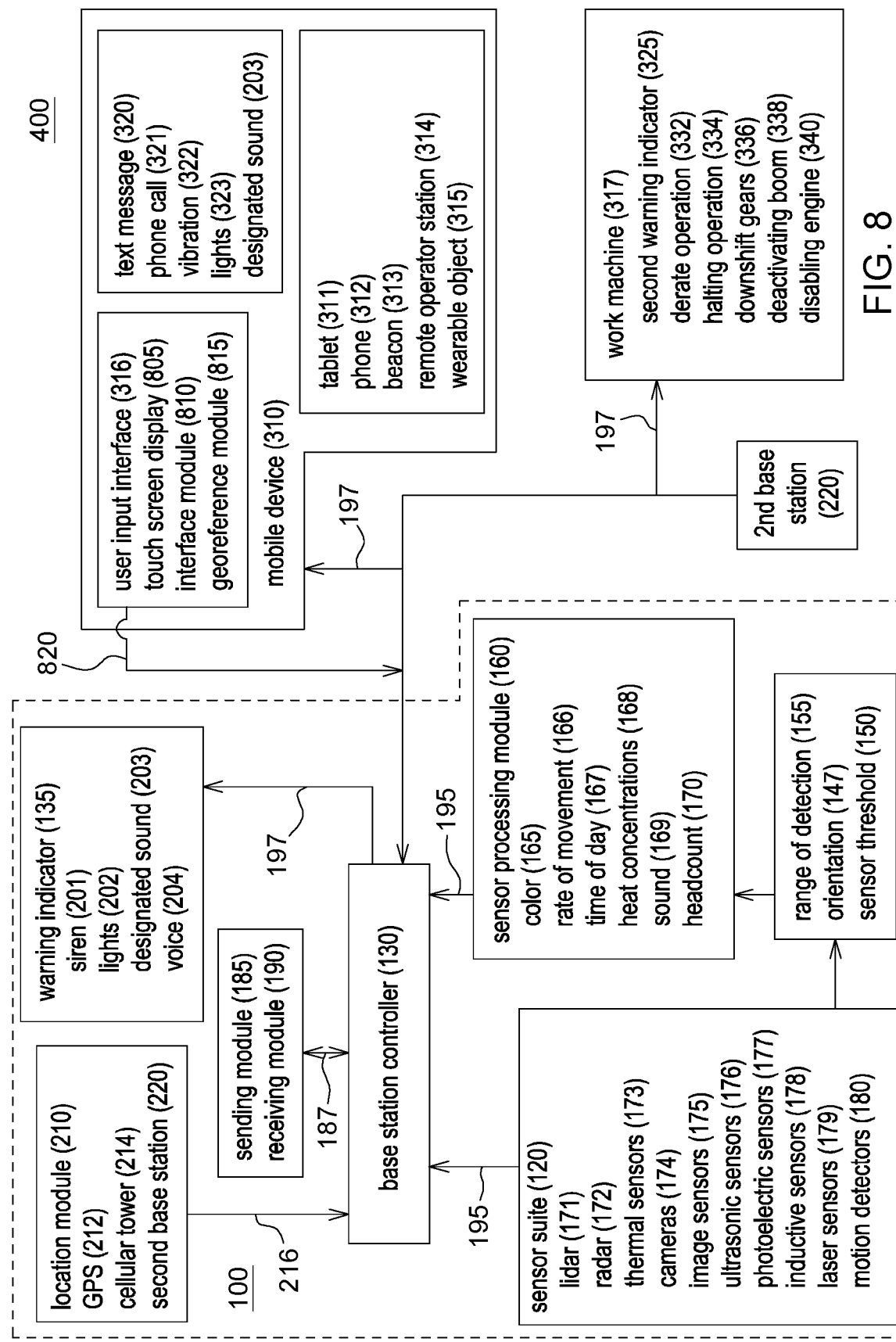
FIG. 8 is a schematic of the restrictive zone enforcement system.

As shown in FIG. 8 with continued reference to FIG. 1, the sensor suite 120 may be configured to detect one or more undesired objects 140 in a subzone 145 wherein the subzone 145 (shown in FIGS. 4-7B) may be defined as the area monitored by the base station 100. In default mode, the subzone 145 may be limited by the range of detection 155 from the sensor suite 120 (e.g., if the sensor suite 120 includes a camera, the range of detection may be the field of view of the camera). This range of detection 155 may rely on one or more of sensor capability, the orientation 147 of the sensor suite 120 on the base station 100, the sensor threshold 150 to activate a warning indicator 135 for each sensor, and the algorithm supporting the combination of sensor thresholds 150 to detect an undesired object 140 in the subzone 145, by an individual sensor or collectively by multiple sensors. In one exemplary scenario, the sensor suite 120 may detect movement of an undesired object 140 (e.g. a person). However, a sensor processing module 160 one the base station may distinguish between an authorized object (e.g. an operator or construction worker in the restrictive zone 305) and an undesired object from images acquired from a camera. The algorithm may use a myriad of distinguishing factors and logic sequences to determine the status of a moving object wherein the distinguishing factors may include but is not limited to, color 165, rate of movement 166, time of day 167, heat concentrations 168, sound 169, headcount 170, etc. The sensor suite 120 may comprise one or more of lidar 171, radar 172, thermal sensors 173, cameras 174, image sensors 175, ultrasonic sensors 176, photoelectric sensors 177, inductive sensors 178, laser sensors 179, and motion detectors 180. Each base station 100 may be customized to include one or more sensors based on the needs of the application, the anticipated environmental conditions of use, and economics.

The base station 100 may further comprise of a sending module 185 emitting a steady signal 187 configured to bounce of a surface, and a receiving module 190 configured to receive a reflection of the steady signal 187 after it has bounced off the surface. The receiving module 190 may then analyze the steady signal 187 received to identify undesired objects that are moving in the subzone 145. The information from the receiving module 190 may be a source of information of object detection, or alternatively incorporated into the information from the sensor suite 120.

The base station 100 may further comprise a base station controller 130 communicatively coupled to the sensor suite 120. The base station controller 130 may be configured to receive one or more output signals 195 from the sensor suite 120. The base station controller 130 may then generate and transmit an alert signal 197 based on the output signals 195 (e.g., based on reaching a sensor threshold from sensor suite 120, where the threshold is indicative of an undesired object entering the restrictive zone 305).

The base station 100 can include a processor communicatively coupled to a memory device. Non-limiting examples of the processor can include a Field-Programmable Gate Array (FPGA), an application-specific integrated circuit (ASIC), a microprocessor, etc. The processor can execute program code stored in the memory device to perform operations. The memory device can be non-volatile and may include any type of memory device that retains stored information when powered off. Non-limiting examples of the memory device include electrically erasable and programmable read-only memory (EEPROM), flash memory, or any other type of non-volatile memory. In some examples, at least some of the memory device can include a non-transitory computer-readable medium from which the processor can read the program code. Examples of a non-transitory computer-readable medium include magnetic disk(s), memory chip(s), ROM, random-access memory (RAM), an ASIC, a configured processor, optical storage, or any other medium from which a computer processor can read the program code.

To convey danger to the undesired object and/or surrounding personnel, the base station 100 may further comprise of one or more warning indicators 135 located on the base station 100. The warning indicators 135 may include a siren 201, lights 202, designated sound 203, and a voice 204, to name a few.

The base station may further comprise a location module 210 for detecting a geographical location of the base station 100. The location module 210 may comprise one or more of a global positioning system 212, a device communicatively coupled to a local cellular tower 214 with known location, or a location module communicatively coupled to a second base station 220 wherein the location of the second base station 220 is known. In one embodiment, one or more base stations 100 may relay their relative positions where only a master base station 225 is configured to receive a location signal. In alternative embodiment, three or more base stations 100 may triangulate their position for a more granular level of accuracy.

Now turning to FIG. 3 with continued reference to FIG. 8, a mobile device 310 located remote from the base station 100 and communicatively coupled to the base station controller 130 may also comprise a warning indicator 135 configured to activate in response to receiving the alert signal 197. The communicative coupling between the base station 100 and the mobile device 310 may include any type of wired or wireless communication such as Bluetooth, satellite communication, or Wi-Fi. The mobile device 310 may be one or more of a tablet 311, phone 312, a beacon 313, a remote operator station 314, a wearable object 315, and a user input interface 316 on a work machine 317. The mobile device 310 may activate by creating a text message 320 to alert an operator, initiating a phone call 321 to an operator, vibrating 322, lighting up 323, or creating a designated sound 203.

Additionally, one or more work machines 317 in the restrictive zone 305 may be communicatively coupled to the base station controller 130, wherein a second warning indicator 325 may alert an operator in the cab of the work machine upon receiving the alert signal 197. The second warning indicator 325 positioned in or on the cab of the work machine 317 near the operator, warns the operator of the undesired object entering the restrictive zone 305. Even though the operator may move the work machine 100 through different areas of the restrictive zone 305, the operator may be warned by the second warning indicator 325.

The base station controller 130 may further be communicatively coupled to the work machine controller 330, thereby enabling automatically derating operation 332 of the work machine 317, or halting operation 334 of the work machine 317 upon receiving the alert signal 197. Examples of derating operation 317 include one or more of automatically downshifting the gears on the work machine 336, deactivating boom operation 338, and disabling the engine 340.

As shown in FIGS. 3 through 6, the system may further comprise a second base station 220 configured to detect one or more undesired objects into a second subzone 345, wherein the second base station 220 is communicatively coupled with the first base station 100 (the first base station being base station 100). In one embodiment, the subzone 145 (also referred to herein as the first subzone) and the second subzone 345 may overlap, like a Venn diagram and shown by dotted lines in FIG. 4. Similarly, the system 400 may further comprise a third base station 350 configured to detect one or more undesired objects into a third subzone 355. The system 400 may comprise X number of base stations with X number of subzones.

Figure 5:
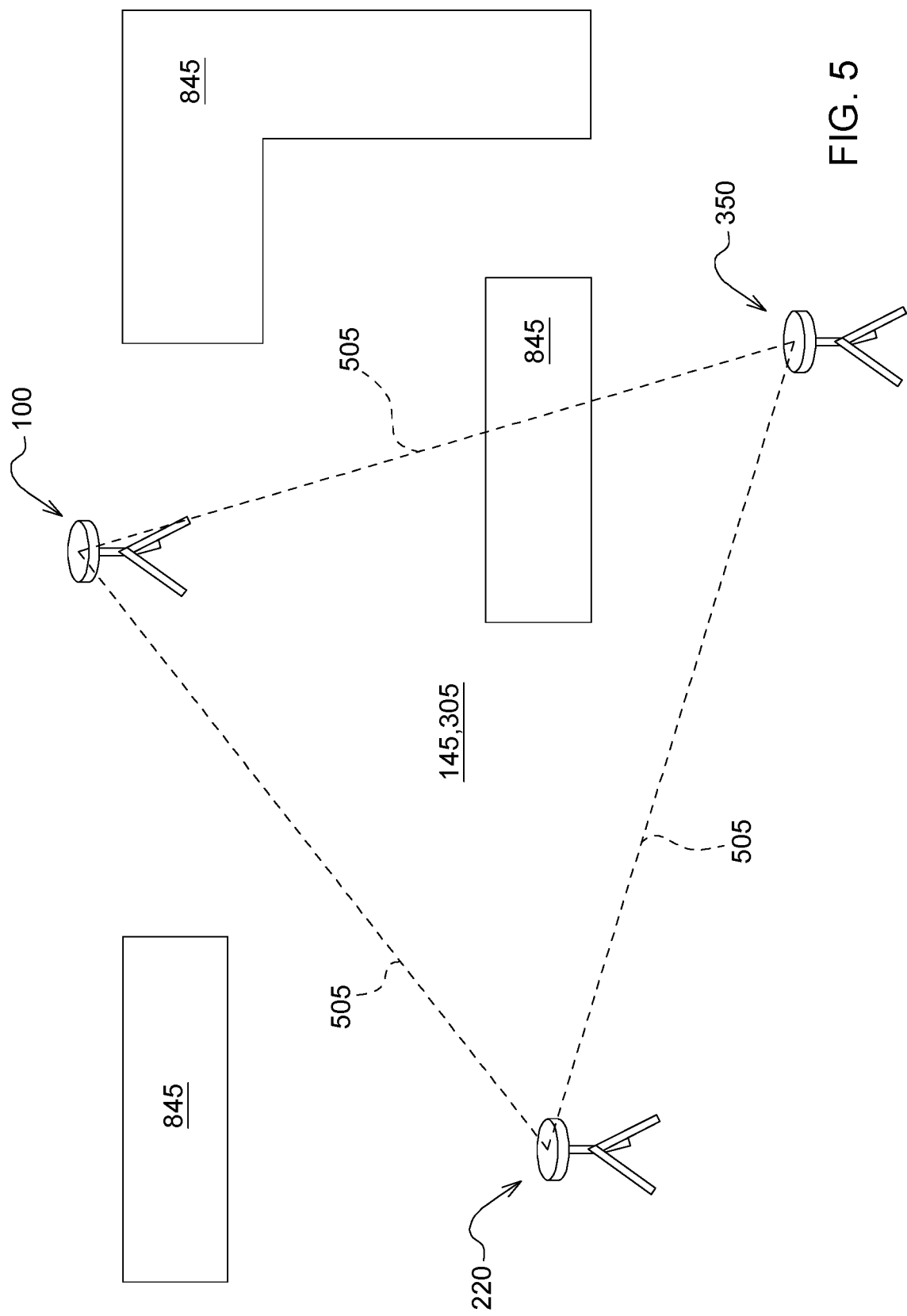
FIG. 5 is an aerial view of a restricted zone enforcement system according to a second embodiment.
Figure 6:
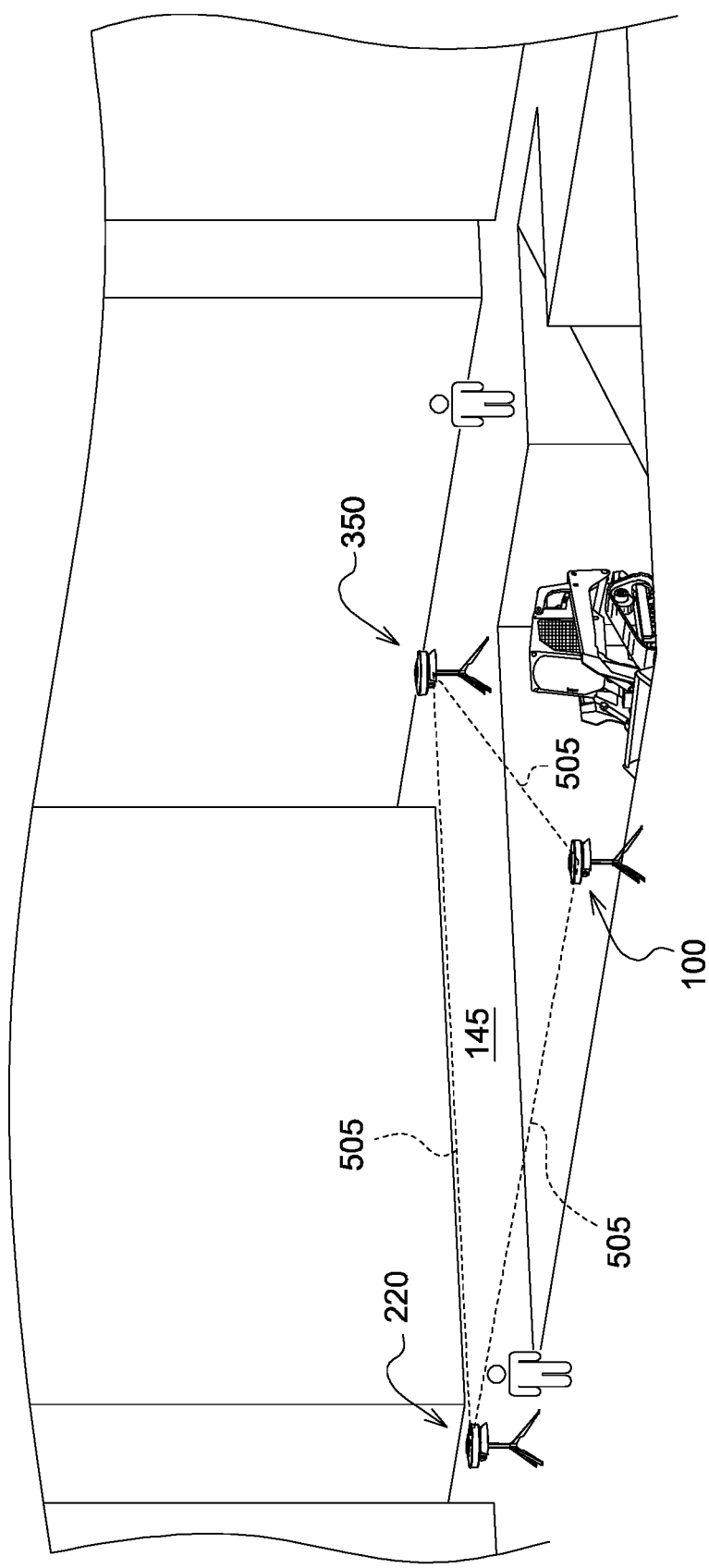
FIG. 6 is a perspective view of a restricted zone enforcement system according to the second embodiment.
Figure 7:
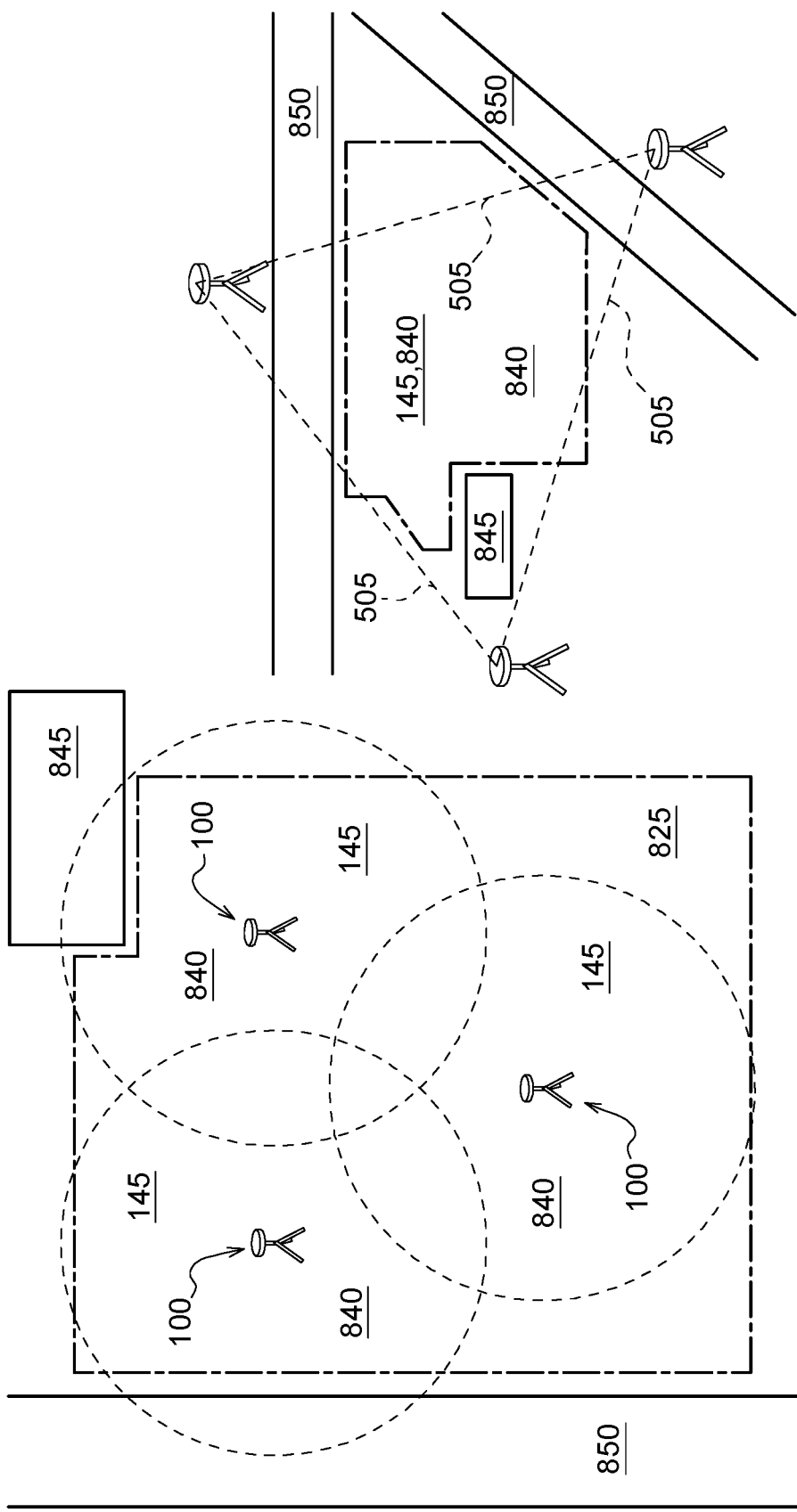
FIG. 7A is a view of a touch screen on a mobile device according to the first embodiment of the restrictive zone enforcement system.
FIG. 7B is a view of a touch screen on a mobile device according to the first embodiment of the restrictive zone enforcement system.

In an alternative embodiment, shown in FIGS. 5 and 6, positioning of three or more base stations 100 in or around a restricted zone 305 may create a perimeter 505 or enclosure for the subzone 145 wherein each base station 100 is communicatively coupled to another. The subzone 145 may be restricted by a straight line between the first base station 100 and the second base station 220, the straight line defining at least a portion of the perimeter 505 of the subzone 145. This methodology may provide a simplistic approach to secure a restrictive zone 305, wherein physical placement of the base station in an area defines the restrictive area to be enforced.

Now turning to FIGS. 7A, and 7B, with continued reference to FIG. 8, the subzone 145 may be further customized by the mobile device 310. In one exemplary embodiment, the mobile device 310 comprises a user input interface 316 with a touch screen display 805, an interface module 810, and a geofence module 815. The interface module 810 may be configured to display an aerial map of a worksite, schematically or photographically, and receive operator input 820 from the touch screen display 805. The operator input 820 results from an operator touching the touch screen display 805. The geofence module 815 may be configured to derive a geofence subzone 825 further defined by the operator input 820. To derive a geofence subzone 825 further defined by operator input 820, the geofence module 815 is configured to determine a location of the input on the aerial map 830, identify the location of one or more base stations 100 on the aerial map 830, and identify the geofence overlap 840 between the subzone 145 and the geofence subzone 825 where detection of the one or more undesired objects is enforced. The geofence module 815 may construct a polygonal representation of the operator input to define the geofence subzone relative to the one or more base stations on the aerial map.

FIG. 7A is a view of a touch screen on a mobile device according to the first embodiment of the restrictive zone enforcement system. One or more base stations 100 are placed in or around a restrictive zone creating a subzone 145. Geographical structures, both natural and man-made, such roads, buildings, river, hills, mountains, and other geographical structures may further be defined on the aerial map. The geofence module may construct a polygonal representation of the operator input to define the geofence subzone relative to one or more geographical structures on the aerial map. The ability to define a geofence advantageously allows the user to customize restricted zone enforcement on a granular scale, which is especially useful in crowded spaces such as a cityscape. A cityscape may include one or more buildings 845, or roads 850.

FIG. 7B is a view of a touch screen on a mobile device according to the second embodiment of the restrictive zone enforcement system. Again, the geofence overlap 840 comprises the area between the subzone 145 and the geofence subzone 825. The system 400 of restrictive zone enforcement advantageously allows for a customizable and stackable method of restrictive zone enforcement depending on the needs of the user, and worksite conditions.

One or more of the steps or operations in any of the methods, processes, or systems discussed herein may be omitted, repeated, or re-ordered and are within the scope of the present disclosure.

While the above describes example embodiments of the present disclosure, these descriptions should not be viewed in a restrictive or limiting sense. Rather, there are several variations and modifications which may be made without departing from the scope of the appended claims.

What is claimed is:

1. A restricted zone enforcement system for detecting one or more undesired objects in a restricted zone at a worksite, the system comprising:
    a first base station configured to be placed in or around the restricted zone, the first base station including:
        a housing;
        a sensor suite configured to detect the one or more undesired objects in a subzone at least partially overlapping with the restricted zone and generate an output signal based on the one or more undesired objects, the subzone being limited by a range of detection from the sensor suite, and the subzone being restricted by a straight line between the first base station and a second base station, the straight line defining at least a portion of a perimeter of the subzone; and
        a base station controller configured to receive the output signal from the sensor suite and transmit an alert signal based on the output signal;
    a warning indicator configured to activate in response to receiving the alert signal.

2. The system of claim 1, further comprising a mobile device that includes:
    a touch screen display;
    an interface module configured to display an aerial map of the worksite on the touch screen display, and receive an operator input from the touch screen display, the operator input resulting from an operator touching the touch screen display; and
    a geofence module configured to derive a geofence subzone further defined by the operator input.

3. The system of claim 2, wherein to derive the geofence subzone defined by the operator input, the geofence module is configured to:
    determine a location of the operator input on the aerial map;
    identify a location of at least one base station on the aerial map; and
    identify an overlap between the subzone and the geofence subzone where detection of the one or more undesired objects is enforced.

4. The system of claim 2, wherein to derive the geofence subzone defined by the operator input, the geofence module is further configured to:
    identify at least one geographical structure corresponding to a location of the operator input; and
    construct a polygonal representation of the operator input to define the geofence subzone relative to the at least one geographical structure on the aerial map.

5. The system of claim 1, further comprising the second base station, the second base station being configured to detect the one or more undesired objects in a second subzone, the second base station being communicatively coupled with the first base station.

6. The system of claim 1, wherein the sensor suite comprises a radar sensor, ultrasonic sensor, capacitive sensor, photoelectric sensor, inductive sensor, laser sensor, thermal sensor, infrared sensor, image sensor, or motion detector.

7. The system of claim 1, wherein the sensor suite comprises a camera for detecting the one or more undesired objects.

8. The system of claim 1 further comprising a work machine, the work machine being communicatively couplable to the base station controller and including a second warning indicator configured to alert an operator in a cab of the work machine in response to receiving the alert signal.

9. The system of claim 8, wherein the work machine is configured to derate operation of the work machine or halt operation of the work machine in response to receiving the alert signal.

10. A restricted zone enforcement system for detecting one or more undesired objects in a restricted zone at a worksite, the system comprising:
    a first base station configured to be placed in a first location, the first location being in or around the restricted zone; and
    a second base station configured to be placed in a second location, the second location being in or around the restricted zone;
    wherein the first base station and the second base station each include:
        a housing;
        a sensor suite configured to detect one or more undesired objects in a subzone at least partially overlapping with the restricted zone and generate an output signal based on the one or more undesired objects, the subzone being limited by a range of detection from the sensor suite;

a base station controller configured to receive the output signal from the sensor suite and transmit an alert signal based on the output signal; and a warning indicator configured to activate in response to receiving the alert signal; and wherein the subzone is restricted by a straight line between the first base station and the second base station, the straight line defining at least a portion of a perimeter of the subzone.

11. The restricted zone enforcement system of claim 10, the first base station further comprising a location module configured to detect a geographical location of the first base station.

12. The restricted zone enforcement system of claim 10, wherein the sensor suite comprises a radar sensor, ultrasonic sensor, capacitive sensor, photoelectric sensor, inductive sensor, laser sensor, thermal sensor, infrared sensor, image sensor, and motion detector.

13. The restricted zone enforcement system of claim 10, wherein the second base station is configured to communicatively couple with the first base station, and further comprising a third base station configured to communicatively couple with the first base station and the second base station, wherein the subzone is further restricted by another straight line between the second base station and the third base station.

14. The restricted zone enforcement system of claim 10, wherein the base station controller is configured to transmit the alert signal to a mobile device located remotely from the base station controller, the mobile device being configured to receive the alert signal and activate a warning indicator on the mobile device in response to receiving the alert signal.

15. The restricted zone enforcement system of claim 10, wherein the base station controller is configured to transmit the alert signal to a work machine located remote from the base station controller, the work machine being configured to derate operation or halt operation in response to receiving the alert signal.

16. A mobile device comprising:

a touch screen display;

an interface module configured to display an aerial map of a worksite on the touch screen display and to receive an operator input from the touch screen display; and a geofence module configured to:
  determine a geofence subzone based on the operator input by:
    identifying locations of base stations on the aerial map, the base stations being located at the worksite for detecting one or more undesired objects in subzones at the worksite; and
    identifying an overlap between the subzones and the geofence subzone where detection of the one or more undesired objects is to be enforced; and
  construct a polygonal representation of the operator input to define the geofence subzone relative to the base stations on the aerial map.

17. The mobile device of claim 16, wherein to derive the geofence subzone based on the operator input, the geofence module is further configured to:

identify at least one geographical structure corresponding to a location of the operator input on the touch screen display; and construct the polygonal representation of the operator input to define the geofence subzone relative to the at least one geographical structure on the aerial map.

18. The mobile device of claim 16, wherein the base stations include location modules configured to detect the locations of the base stations for transmission to the mobile device.

19. The mobile device of claim 16, wherein the base stations each include:

a sensor suite configured to detect the one or more undesired objects and generate an output signal based on the one or more undesired objects; and a base station controller configured to receive the output signal from the sensor suite and transmit an alert signal based on the output signal.

* * * * *